(12) United States Patent
Eiríksson et al.

(10) Patent No.: US 11,376,794 B2
(45) Date of Patent: Jul. 5, 2022

(54) ADDITIVE MANUFACTURING APPARATUS AND METHOD

(71) Applicant: Euler3d ApS, Glostrup (DK)

(72) Inventors: Eypór Rúnar Eiríksson, Søborg (DK); David Bue Pedersen, Fredensborg (DK); Hans Nørgaard Hansen, Birkerød (DK); Henrik Aanæs, Taastrup (DK)

(73) Assignee: Euler3d ApS, Glostrup (DK)

( * ) Notice: Subject to any disclaimer, the term of this patent is extended or adjusted under 35 U.S.C. 154(b) by 0 days.

(21) Appl. No.: 16/493,397

(22) PCT Filed: Mar. 13, 2018

(86) PCT No.: PCT/EP2018/056196
§ 371 (c)(1),
(2) Date: Sep. 12, 2019

(87) PCT Pub. No.: WO2018/177036
PCT Pub. Date: Sep. 20, 2018

(65) Prior Publication Data
US 2020/0001541 A1 Jan. 2, 2020

(30) Foreign Application Priority Data

Mar. 13, 2017 (EP) .................................... 17160600
Mar. 23, 2017 (EP) .................................... 17162604

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/124* (2017.08); *B29C 64/343* (2017.08);
(Continued)

(58) Field of Classification Search
CPC ... B29C 64/124; B29C 64/343; B29C 64/393; B33Y 10/00; B33Y 30/00; B33Y 50/02
See application file for complete search history.

(56) References Cited

U.S. PATENT DOCUMENTS

| 5,258,146 A | 11/1993 | Almquist |
| 2008/0113293 A1 | 5/2008 | Shkolnik |

FOREIGN PATENT DOCUMENTS

| EP | 2 186 625 A2 | 5/2010 |
| WO | WO 1998/041944 A1 | 9/1998 |
| WO | WO 2009/102200 A1 | 8/2009 |

OTHER PUBLICATIONS

International Search Report and Written Opinion in International Application No. PCT/EP2018/056196 dated Sep. 20, 2018 (9 pages).
(Continued)

*Primary Examiner* — Robert J Grun
(74) *Attorney, Agent, or Firm* — Nixon Peabody LLP

(57) ABSTRACT

An additive manufacturing apparatus for building a product according to a planned geometry by successive solidification of a radiation-curable fluid in a solidification layer extending in a vertical direction from a surface of the fluid to a surface of the product. The apparatus includes: a vat holding the fluid; a support holding the product; a mechanism to control feeding of fluid to the solidification layer; a curing radiation source to generate a 2D exposure pattern of curing radiation in the solidification layer. The exposure pattern is defined by a curing radiation pattern geometry and/or curing radiation intensity. A radiation sensor receives radiation from the solidification layer. The radiation sensor generates a sensor signal having information indicative of a solidification process status. A control system is connected to the feed control mechanism and the curing radiation source. The control system receives the sensor signal and responsive thereto
(Continued)

adjusts parameters controlling the solidification in the solidification layer.

18 Claims, 12 Drawing Sheets

(51) Int. Cl.
*B33Y 30/00* (2015.01)
*B33Y 50/02* (2015.01)
*B29C 64/124* (2017.01)
*B29C 64/343* (2017.01)

(52) U.S. Cl.
CPC ............... *B33Y 10/00* (2014.12); *B33Y 30/00* (2014.12); *B33Y 50/02* (2014.12)

(56) References Cited

OTHER PUBLICATIONS

International Preliminary Report on Patentability in International Application No. PCT/EP2018/056196 dated Feb. 18, 2019 (7 pages).

ADDITIVE MANUFACTURING APPARATUS AND METHOD

CROSS-REFERENCE TO RELATED APPLICATIONS

This application is a U.S. National Stage of International Application No. PCT/EP2018/056196, filed Mar. 13, 2018, which claims the benefit of European Patent Application No. 17160600.7, filed Mar. 13, 2017, and of European Patent Application No. 17162604.7, filed Mar. 23, 2017, all of which are incorporated herein by reference in their entireties.

FIELD OF THE INVENTION

The present invention relates to additive manufacturing.

BACKGROUND OF THE INVENTION

In conventional vat photopolymerization additive manufacturing apparatuses (also known for instance as stereolithography, photo-solidification, and resin printing), a three-dimensional model of a product to be manufactured is "sliced" into thin horizontal two-dimensional model layers. A light source, such as a laser or a projector, is used to selectively solidify liquid photopolymer in accordance with the shape of these two-dimensional model layers during manufacturing to obtain a product having a shape corresponding to the model. In some additive manufacturing methods, the following procedure is used to create the physical product:
1. The liquid resin is exposed to radiation having a pattern corresponding to a two-dimensional layer of the three-dimensional object for a duration until that layer is fully cured (solidified).
2. The partially completed product is submerged into the liquid by the height of one layer.
3. The surface of the photo polymer liquid is traversed with a scraper for recoating and minimization of surface tension effects.
4. The steps above are repeated until all object layers have been realized, resulting in the product being completed.

Employing this conventional method yields manufacturing rates that can be measured in micrometers per minute. This is partly due to the time-consuming recoating process that involves supplying resin and obtaining a flat surface. Additionally, due to the discrete and finite thickness of the slicing, an undesirable artifact known as the staircase artifact appears on the product.

SUMMARY OF THE INVENTION

Embodiments of the present invention can mitigate the situation described above. The following itemized list discloses advantageous aspects and embodiments of the additive manufacturing apparatus and method. Advantages, which may be achieved by any of the features disclosed herein, alone or in combination, will become clear from the discussion of different aspects of the invention as illustrated by exemplary embodiments in the following and in the detailed description.

Item 1. An additive manufacturing apparatus (200) for building a product by additive manufacturing, comprising:
- a vat (201) for holding a radiation-curable fluid to be selectively cured to form the product,
- a build platform (203) for holding the product during building, the build platform (203) may be a separate part arranged inside the vat or may be formed by at least a section of the bottom of the vat and/or may comprise a platform stage (204) for changing a position of the build platform relative to a surface of the radiation-curable fluid during building of the product, the platform stage (204) being controlled by a platform stage control signal
- a curing radiation source (205) configured to receive a curing radiation source control signal and to emit a corresponding two-dimensional curing radiation pattern in a direction towards the surface of the radiation-curable fluid, whereby a corresponding part of the radiation-curable fluid is cured,
- a radiation sensor (207) configured to produce a sensor signal representing radiation reflected by and/or emitted from the surface of the radiation-curable fluid,
- one or more inlets (215) for supply of radiation-curable fluid into the vat (201),
- a control system (209) configured to:
  - i) provide a dynamic characterization of a shape of the surface of the fluid based on the sensor signal during building of the product,
  - ii) retrieve a geometry information representing a planned geometry, or a part thereof, of the product to be built,
  - iii) determine one or more of a curing radiation pattern and curing radiation intensity to be emitted by the curing radiation source in order to cure the radiation-curable fluid in accordance with the planned geometry, the determining being based at least on the geometry information and the dynamic characterization of the shape of the surface,
  - iv) provide a curing radiation source control signal to the curing radiation source corresponding to the determined curing radiation pattern and/or intensity.

Item 2. An additive manufacturing apparatus according to item 1, wherein the control system (209) further is configured to provide a fluid supply control signal for a radiation-curable fluid supply system configurable to provide a flow of radiation-curable fluid into the vat (201) through the one or more inlets (215).

Item 3. An additive manufacturing apparatus (200) according to item 2, wherein control system further is configured to provide a fluid supply signal for the supply system to provide a radiation-curably fluid at a variable flow rate, the radiation-curable fluid supply system being configured to increase and decrease the flow rate of radiation-curable fluid in response to a change in the fluid supply control signal indicating that an increase or decrease, respectively, is required.

Item 4. An additive manufacturing apparatus in accordance with any of the preceding items, further comprising a radiation-curable fluid supply system operably coupled to the control system to receive the fluid supply control signal and to increase or decrease the flow rate of radiation-curable fluid into the vat in response to a change in the fluid supply control signal indicating that an increase or decrease, respectively, is required.

Item 5. An additive manufacturing apparatus in accordance with item 4, wherein the radiation-curable fluid supply system comprises a system of one or more outlets, forming inlets for feeding radiation-curable fluid into the vat, and the flow through said one or more outlets being controllable by the control system to increase or decrease the flow rate of radiation-curable fluid into the vat in response to a change in the fluid supply control signal indicating that an increase or decrease, respectively, is required.

Item 6. An additive manufacturing apparatus in accordance with item 5, wherein the system of one or more outlets comprises one or more outlets arranged in a bottom part of the vat, in a side wall of the vat, and/or one or more outlets arranged separate from the vat, such as above the vat.

Item 7. An additive manufacturing apparatus in accordance with one of items 2-6, wherein the radiation-curable fluid supply system comprises a heater and/or a cooler for changing a temperature of the radiation-curable fluid to be resupplied into the vat by the radiation-curable fluid supply system.

Item 8. An additive manufacturing apparatus in accordance with one of items, wherein the bottom of the vat forms the build platform or the build platform is a separate part removeably attachable to the vat.

Item 9. An additive manufacturing apparatus in accordance with one of the preceding items, wherein the build platform comprises one or more holes for allowing radiation-curable fluid resupplied below the build platform to pass through at least a part of the build platform during building of the product.

Item 10. An additive manufacturing apparatus in accordance with one of the preceding items, wherein the curable radiation source comprises a projector.

Item 11. An additive manufacturing apparatus in accordance with item 10, wherein the curable radiation source is moveable relative to the vat, and the additive manufacturing apparatus is configured to maintain a constant distance between the curable radiation source and the surface of the radiation-curable fluid during building of the product, or to set prior to printing the height of the curable radiation source, e.g. to optimize print resolution.

Item 12. An additive manufacturing apparatus in accordance with one of the preceding items, wherein the control system is configured to provide a curing radiation pattern that selectively cures a part of the radiation-curable fluid surface in case said part coincides with a part of the planned geometry of the product.

Item 13. An additive manufacturing apparatus in accordance with one of the preceding items, wherein the curing radiation source (205) is an orthographic projector, a perspective projector or a laser point source configured to race a 2D pattern.

Item 13a. An additive manufacturing apparatus in accordance with one of the preceding items, wherein the control system is configured to enable the platform stage to move continuously while the curing radiation source is curing radiation-curable fluid.

Item 14. An additive manufacturing apparatus in accordance with one of the preceding items, wherein the characterization of the shape of the surface includes determining a topography of at least a part of the surface of the radiation-curable fluid.

Item 15. An additive manufacturing apparatus in accordance with item 14, wherein the topography is determined by recording a plurality of two-dimensional images of reflected and/or emitted radiation from the surface of the radiation-curable fluid and determining surface height variations in the surface based on:
  intensity variations in one or more of the two-dimensional images, and/or
  temporal intensity variations in the two-dimensional images.

Item 16. An additive manufacturing apparatus in accordance with one of the preceding items, further comprising an illumination source (211) for providing radiation to be reflected by the surface of the radiation-curable fluid for the dynamic characterization of the shape of the surface.

Item 17. An additive manufacturing apparatus in accordance with item 16, wherein the illumination source is configured to emit one or more two-dimensional illumination patterns comprising a set of one or more image features, and the control system is configured to determine a topography of the surface of the radiation-curable fluid at least based on how the one or more image features are reflected onto the sensor by the surface of the radiation-curable fluid.

Item 18. An additive manufacturing apparatus in accordance with one of the preceding items, wherein the characterization of the shape of the surface includes monitoring radiation reflected and/or emitted from a part of the surface, and wherein a motion of the build platform and/or the flow rate of radiation-curable fluid into the vat and/or the two-dimensional curing radiation pattern and/or the curing radiation intensity are adjusted in response to changes in the radiation reflected and/or emitted radiation said part of the surface.

Item 19. An additive manufacturing apparatus in accordance with one of the preceding items, wherein a motion of the build platform and/or the flow rate of radiation-curable fluid into the vat and/or the two-dimensional curing radiation pattern and/or the curing radiation intensity are adjusted to ensure that a local flow of radiation-curable fluid onto cured radiation-curable fluid is sufficient for building a further part of the product in accordance with the planned geometry.

Item 20. An additive manufacturing apparatus in accordance with one of the preceding items, further comprising a second curing radiation source configured to receive a second curing radiation source control signal and to emit a corresponding second two-dimensional curing radiation pattern in a direction towards the surface of the radiation-curable fluid.

Item 21. A method for building a product by additive manufacturing in an additive manufacturing apparatus, the additive manufacturing apparatus comprising:
  a vat for holding a radiation-curable fluid to be selectively cured to form the product,
  a build platform for holding the product during building, the build platform (203) may be a separate part arranged inside the vat or be formed by at least a section of the bottom of the vat, or may comprise a platform stage for changing a position of the build platform relative to a surface of the radiation-curable fluid during building of the product, the platform stage being controlled by a platform stage control signal,
  a curing radiation source configured to receive a curing radiation source control signal and to emit a corresponding two-dimensional curing radiation pattern in a direction towards the surface of the radiation-curable fluid, whereby a corresponding part of the radiation-curable fluid is cured,
  a radiation sensor configured to produce a sensor signal representing radiation reflected by and/or emitted from the surface of the radiation-curable fluid,
  the method comprising:
  producing, using the radiation sensor, a sensor signal representing radiation reflected by and/or emitted from the surface of the radiation-curable fluid,
  providing a dynamic characterization of a shape of the surface of the fluid based on the sensor signal,
  retrieving a geometry information representing a planned geometry of the product being built, determining one or both of a curing radiation pattern and curing radiation intensity to be emitted by the curing radiation source in order to cure the radiation-curable fluid in accordance with the planned geometry, or a part thereof, the determining being based at least on the geometry information and the dynamic characterization of the shape of the surface, and then providing a corresponding curing radiation source control signal to the curing radiation source, and providing an inflow of radiation-curable fluid into the vat.

Item 22. A method according to item 21, wherein the method further comprises providing a fluid supply control signal for a radiation-curable fluid supply system configurable to provide radiation-curable fluid at a variable flow rate, the radiation-curable fluid supply system being configured to increase and decrease the flow rate of radiation-curable fluid in response to a change in the fluid supply control signal indicating that an increase or decrease, respectively, is required.

Item 22a. A method in accordance with item 21 or 22, wherein the method further comprises providing a platform stage control signal to the platform stage to cause a motion of the build platform during building of the product.

Item 23. A method in accordance with item 21 or 22 or 22a, wherein the curing radiation pattern is adapted responsive to the sensor signal to cause curing of a part of the radiation-curable fluid surface in case said part coincides with a part of the planned geometry of the product.

Item 24. Digital computing hardware or a computing hardware being at least partially analog configured to act as the control system in an additive manufacturing apparatus in accordance with one of items 1-20.

Item 25. A computer-readable medium comprising instructions which, when executed on suitable computing hardware in an additive manufacturing apparatus in accordance with one of items 1-20, enable the additive manufacturing apparatus to perform steps i) to iv).

According to a further aspect, the invention provides an additive manufacturing apparatus for building a product according to a planned geometry by successive solidification of a radiation-curable fluid in a solidification layer, the solidification layer extending in a vertical direction from a fluid surface of the radiation-curable fluid to a work piece surface of the product, wherein the apparatus comprises:

a vat for holding the radiation-curable fluid;
a work piece support for holding the product during building;
a feed control mechanism adapted for controlling feeding of radiation-curable fluid to the solidification layer;
a curing radiation source adapted for generating a two-dimensional exposure pattern of curing radiation in the solidification layer, wherein the exposure pattern is defined by a curing radiation pattern geometry and/or curing radiation intensity;
a radiation sensor arranged to receive radiation from the solidification layer, wherein the radiation sensor is configured to generate a sensor signal comprising information indicative of a solidification process status based on the received radiation; and
a control system communicatively connected to the feed control mechanism and the curing radiation source, the control system being adapted to receive the sensor signal, and to adjust process control parameters controlling the solidification in the solidification layer, in response to said sensor signal.

The curing radiation is adapted for causing solidification of the radiation-curable fluid in the solidification layer. The exposure pattern is generated in accordance with the planned geometry. However, in order to achieve a good build quality mitigating the print quality issues discussed above, the actual solidification is in the present invention controlled very precisely, by measuring a quantity indicative of the solidification process status and adjusting relevant solidification process control parameters in response to said quantity. For example, a solidification rate and a depth (as seen in a vertical direction) of solidification at a given location in the solidification layer typically depend on exposure intensity or dose at that location. The solidification rate and depth may furthermore be influenced by the amount of radiation-curable fluid available in the solidification layer at that location.

The radiation sensor is arranged to receive radiation from the solidification layer, e.g. radiation reflected from the surface of the radiation curable fluid. The reflected radiation may be reflected curing radiation. Alternatively or in addition thereto, the reflected radiation may be reflected probing radiation, wherein the probing radiation is radiation illuminating the surface of the solidification layer. Preferably, the probing radiation is optically distinguishable, such as spectrally distinguishable, from the curing radiation so as to allow for selective collection of the reflected radiation. Thereby, a good signal to noise ratio of the optical probing of the solidification layer surface may be achieved.

The radiation sensor is configured to generate a sensor signal comprising information indicative of a process status of solidification occurring in the solidification layer, based on the received radiation. For example, the shape of the surface of the solidification layer may contain such information on the solidification process status, e.g. in the form of characteristic features in the surface topography due to surface tension effects.

Monitoring and analysing the surface topography or at least one or more parameters indicative of the shape of the surface, at least at selected locations, may thus be used to collect such information indicative of a solidification process status. The sensor signal may incorporate this information e.g. directly as is, or in a processed form, e.g. as a processed value indicative of a deviation from an expected or ideal surface shape for a desired solidification process regime. The sensor signal may thus be used as a process feedback signal for controlling the successive solidification in the solidification layer. The control system is adapted to receive the sensor signal, and to determine adjusted process control parameter values for controlling the solidification in the solidification layer, in response to said sensor signal. The control system is furthermore communicatively connected to control devices corresponding to these process control parameters, such as the feed control mechanism for controlling a feed of radiation-curable liquid to the soilidification layer, and the curing radiation source for controlling the exposure pattern in terms of the curing radiation pattern geometry and intensity.

The solidification layer is per definition the layer where solidification takes place during processing. The solidification layer extends, as seen in a vertical direction ("vertical" being defined in a direction of material addition, essentially perpendicular to a plane defining a level of the radiation-curable fluid in the vat), from the surface of the radiation-curable fluid to the solidified material of the work piece. When operating the apparatus to perform certain processing schemes, an interface between the solidification layer and the work piece may be gradual as a solidification gradient may occur at the transition from the semi-manufactured work piece to the radiation-curable fluid. In fact, occurrence of such a gradient may be the desirable process regime, e.g. when building a product in a continuous solidification mode rather than a stepwise layer by layer approach. By providing a continuous solidification mode step artifacts at the surface of the product are reduced or even eliminated. Furthermore, internal material variations in the finished product reminiscent of a stepwise layer by layer processing may also be reduced or even eliminated when operating the apparatus in a continuous solidification mode.

The control system may be set-up so as to maintain a desired process regime, using e.g. a sensor signal from the radiation sensor that is sensitive to radiation that is reflected and/or emitted from the solidification layer and that carries information on the status of the solidification process. Examples for such information are illustrated in detail further below, and may e.g. include parameters indicative of features in the topography of the surface or infrared emission from an exothermal solidification reaction. The radiation sensor may thus generate a signal indicative of these features and variations of such features will then result in a corresponding variation in the sensor signal output from the radiation sensor that can be used as a feedback signal for controlling the solidification process through pertinent process parameters, such as the curing radiation pattern and intensity as well as the feed of radiation-curable fluid to the solidification layer. The solidification process may thus be controlled in real time, which is of particular significance e.g. in the case of a fast and/or continuous building regime requiring a delicate balancing of the process parameters in order to keep the solidification process in the correct processing regime.

Further according to some embodiments of the additive manufacturing apparatus, the radiation sensor is adapted to collect radiation from at least one location on the surface of the solidification layer, the radiation comprising surface shape information for said location; and wherein the radiation sensor is configured to develop the sensor signal based on said surface shape information. The location lies on the surface of the radiation curable fluid in a region where solidification is performed. The surface may at that location exhibit a non-flat region/characteristic feature or may at least at certain points in time be flat. Most importantly, the shape of the surface of the solidification layer is indicative of a solidification process status in the solidification layer. Therefore, a sensor signal can be derived, which is indicative of the solidification process status, by merely monitoring the shape of the surface of the solidification layer, e.g. at the said location. Advantageously, the solidification process may then be controlled using that sensor signal, which has been developed from a mere monitoring of the surface of the radiation-curable fluid.

Further according to some embodiments of the additive manufacturing apparatus, the radiation sensor is adapted to map topography information of at least parts of the surface of the solidification layer; and wherein the radiation sensor is configured to develop the sensor signal based on said topography information. This allows for a precise and comprehensive monitoring of the solidification process status in the solidification layer and consequently a more precise and comprehensive solidification process control with a lateral resolution corresponding to the resolution of the topography mapping by using any of the feed-back control mechanisms disclosed herein. In addition thereto, this furthermore allows for performing a dynamic slicing of the planned geometry for developing the exposure pattern as an intersection between the mapped surface topography and the planned geometry as also described below, thereby further enhancing building precision and fidelity to the planned geometry.

Further according to some embodiments of the additive manufacturing apparatus, the process control parameters include one or more of an amount and a rate of feeding radiation-curable fluid to the solidification layer by the feed control mechanism.

Further according to some embodiments, the additive manufacturing apparatus further comprises fluid control devices, and the control system is configured to operate said fluid control devices so as to adjust a level of the radiation-curable fluid in the vat in response to the sensor signal.

Further according to some embodiments of the additive manufacturing apparatus, the fluid control devices include one or more inlet valves, one or more pumps, and/or one or more displacement mechanisms adapted to displace a volume of radiation-curable fluid in the vat.

Further according to some embodiments, the additive manufacturing apparatus further comprises positioning devices arranged to control a position of the product in the vat, and wherein the control system is configured to adjust a vertical position or rate of motion in a vertical direction of the work piece support in the vat so as to adjust a submersion of the work piece surface below the surface of the radiation-curable fluid, thereby controlling inflow of radiation-curable fluid from the vat reservoir to the solidification layer. In addition to controlling the position of the work piece with respect to a reference point in the vat (e.g. a reference level at the bottom of the vat), the successive submersion of the product during the building process as more and more material is added can also be seen to work as a displacement mechanism for adjusting a level of the radiation-curable fluid in the vat. The term "level" as used herein refers to a vertical position of a horizontal plane, and may be quantified as a distance in the vertical direction from a pre-determined reference point. The level of the radiation-curable fluid in the vat may be defined as a vertical distance of a horizontal plane from a reference point of the vat, wherein the horizontal plane is equal to the height of the fluid in the absence of any surface topography, here in particular in the absence of any surface tension effects and/or any effects of insufficient levelling reflow due to the continuous feed of radiation-curable fluid to the very thin solidification layer. The horizontal plane thus intersects the actual surface of the radiation-curable fluid at an equivalent height corresponding to a simple average of its surface topography.

More generally, any suitable means for causing and controlling an inflow of radiation-curable fluid from the vat reservoir to the solidification layer above the work piece surface may be controlled in response to the sensor signal in order to achieve a feedback control for the successive solidification process for build the product. While the control means and devices given here are advantageous, other control means and devices that are suited for controlling the feed of radiation-curable fluid to the solidification layer can be conceived by the skilled person.

Further according to some embodiments of the additive manufacturing apparatus, the process control parameters include one or more of a curing radiation pattern and a curing radiation intensity.

Further according to some embodiments of the additive manufacturing apparatus, the control system is configured to adjust the curing radiation pattern and/or the curing radiation intensity using the sensor signal from the radiation sensor.

Further according to some embodiments of the additive manufacturing apparatus, the sensor signal comprises information about the surface shape and/or topography of the solidification layer.

According to a further aspect, a method is provided, wherein said method is for building a product by additive manufacturing according to a planned geometry, by successive solidification of a radiation-curable fluid in a solidification layer, the method comprising the steps of:

providing radiation-curable fluid in a vat;
providing a work piece surface for adding material to build the product;
providing a solidification layer, the solidification layer extending in a vertical direction from a fluid surface of the radiation-curable fluid to the work piece surface of the product;
collecting radiation from the solidification layer, in particular preferably from the surface of the solidification layer, by means of a radiation sensor;
generating a sensor signal comprising information indicative of a solidification process status in the solidification layer, based on the collected radiation;
adjusting process control parameters controlling the solidification in the solidification layer, in response to said sensor signal.

Further according to one aspect of the method, the step of adjusting process control parameters includes controlling an amount and/or a rate of feeding radiation-curable fluid to the solidification layer.

Further according to one aspect of the method, feeding radiation-curable fluid to the solidification layer includes feeding radiation-curable fluid in a continuous manner, at least partly during exposure of the solidification layer with curing radiation.

Further according to one aspect of the method, the step of adjusting process control parameters includes adjusting a two-dimensional curing radiation pattern and/or a curing radiation intensity using the sensor signal from the radiation sensor.

Further according to one aspect of the method, the sensor signal comprises information about the surface shape at at least one location on the surface of the solidification layer.

Further according to one aspect of the method, the step of the sensor signal comprises information about the surface topography of at least parts of the surface of the of the solidification layer.

According to further aspects, the invention provides an additive manufacturing apparatus for building a product by additive manufacturing, wherein the additive manufacturing apparatus comprises:

a vat for holding a radiation-curable fluid to be selectively cured to form the product,
a build platform for holding the product during building, the build platform may be a separate part arranged inside the vat or be formed by at least a section of the bottom of the vat,
a curing radiation source configured to receive a curing radiation source control signal and to emit a corresponding two-dimensional curing radiation pattern in a direction towards the surface of the radiation-curable fluid, whereby a corresponding part of the radiation-curable fluid is cured,
a radiation sensor configured to produce a sensor signal representing radiation reflected by and/or emitted from the surface of the radiation-curable fluid,
one or more inlets for supply of radiation-curable fluid into the vat,
a control system configured to:
  i) provide a dynamic characterization of a shape of the surface of the fluid based on the sensor signal during building of the product,
  ii) retrieve a geometry information representing a planned geometry of the product to be built,
  iii) determine one or both of a curing radiation pattern and curing radiation intensity to be emitted by the curing radiation source in order to cure the radiation-curable fluid in accordance with the planned geometry, or a part thereof, the determining being based at least on the geometry information and the dynamic characterization of the shape of the surface,
  iv) provide a curing radiation source control signal to the curing radiation source corresponding to the determined curing radiation pattern and/or curing radiation.

Thus, the present invention may be viewed as residing in a concept where radiation-curable fluid is introduced into a vat and the shape of the surface of the radiation-curable fluid is determined. Based on the determination of the shape of the surface a "feed-back" is provided to the control system informing the system about the height location of surface elements; the system is in such cases considered to operate on pixels, although a surface element may be more than one pixel. If the control system determines that a surface element (or at least a part thereof) is at a position where the not-yet cured radiation-curable fluid below the surface element forms at least a part of the product to be produced, that fluid is cured by emitting curing radiation towards the surface element. Since the surface of the not-yet cured radiation-curable fluid moves upwardly (as seen from the bottom of the vat), due to the infeed of the radiation-curable fluid, the fluid will flood (cover) cured radiation-curable fluid providing non-cured fluid to be cured. By repeating this procedure, the product will grow upwardly. Typically and preferably, the method determines the shape of the surface 3-dimensionally with reference to a fixed coordinate system, thereby providing information as to which section of the product to be printed. This can be seen as the position of elements of the surface and thereby the distance to the curing radiation source is determined.

In some embodiments, of the apparatus the build platform (which may be formed by the bottom of the vat) is stationary and in other the build platform moves. In the latter case, the build platform may comprise a platform stage for changing a position of the build platform relative to a surface of the radiation-curable fluid during building of the product, and control system may be configured to provide the platform stage control signal to the platform stage to cause a motion of the build platform during building. Preferably, the control system may be configured to enable the platform stage to move continuously while the curing radiation source is curing radiation-curable fluid.

In the present context terms are used in a manner being ordinary to a skilled person. Some of these terms are elucidated below:

Inlet is preferably used to mean an opening, a tube, a nozzle or the like forming a passage through which a fluid flow into an element, e.g. into e.g. the vat.

Outlet is preferably used to mean an opening, a tube, a nozzle or the like forming a passage through which a fluid flow out of an element e.g. a fluid container, Fluid supply control signal is preferably used to mean a signal controlling whether or not and even to which extend fluid, such as a radiation-curable fluid flows into e.g. the vat.

Fluid supply is preferably used to mean a supply of fluid, such as radiation-curable fluid, into e.g. the vat. Fluid supply system is preferably used to mean a system composed of e.g. inter alia a container storing a fluid and being fluidic connected such as by tubing or piping to a point of delivery (e.g. the vat). A fluid supply system may comprise controllable valves and/or controllable pumps for pumping fluid to the point of delivery.

Cure is preferably used to mean a toughening or hardening of a material.

Supply of radiation-curable fluid may be viewed as a resupply of radiation-curable fluid that has been solidified in the process of building of the product.

Thus, the supply of radiation-curable fluid is a not a "one time only" step, but a procedure which is carried out during the building of the product to raise the surface of the fluid gradually higher above the bottom of vat which gradual raise is preferably synchronized with the solidification process.

In the present context a fluid supply control signal is preferably to be understood in a broad manner to include also a signal that signal open or closing of a flow radiation-curable fluid into the vat. In some embodiments, the inflow of radiation-curable fluid into the vat is selected in combination with the radiation intensity to ensure that too much radiation-curable fluid is not introduced which may result in insufficient curing in a region in between previously solidified and the surface of the radiation-curable fluid.

Further, one or more inlets for supply of radiation-curable fluid into the vat, may also be understood in broad terms including a fluid connection adapted to feed radiation-curable fluid into the vat.

As presented herein, the curing of the radiation-curable fluid may be controlled by controlling the curing radiation pattern and/or the intensity. In some embodiments, both the pattern and the intensity are controlled and in other the intensity inside a pattern is spatial uniform with a non-zero intensity, and zero outside the pattern. In other embodiment, the intensity is non-uniform so that the intensity reflects the pattern. Thus, the intensity may be spatial non-uniform.

In conventional additive manufacturing apparatuses, the geometry information is essentially the next "layer" to be built. These layers are known in advance because these apparatuses ensure that the surface of the radiation-curable fluid is flat. However, the present invention can provide high-quality products even when the surface is non-flat. The geometry information used in the present information represents at least a part of the product to be built, just as in known apparatuses. However, the curing radiation pattern and curing radiation intensity are adapted so that radiation-curable fluid is cured in accordance with the planned geometry even when the surface is non-flat. This is enabled by essentially determining an intersection between the planned geometry and the actual potentially non-flat shape of the surface of the radiation-curable fluid. Accordingly, in case the surface of the radiation-curable fluid is non-flat, embodiments of the invention actually build products in a correspondingly non-flat fashion. At each moment, it cures those parts of the surface that need curing in order to obtain the planned product. The invention, in a sense, may be thought of as using a "dynamic slicing algorithm" rather than the normal slicing into flat layers described above. The latter method can be used when the surface of the radiation-curable fluid is flat. However, because the shape of the surface of the radiation-curable fluid may be non-flat in the present invention, a corresponding non-flat slicing can determine which parts of the potentially non-flat surface should be solidified next.

Radiation-curable fluid is cured at the surface of the radiation-curable fluid. Accordingly, to build a further part of the product to be built, the control system—or in general a fluid supply system—causes an addition of radiation-curable fluid into the vat in order to allow the surface of the radiation-curable fluid in the vat to rise and cover the newly cured part(s) of the radiation-curable fluid.

In some embodiments, the control system may further be configured to provide a fluid supply control signal for a radiation-curable fluid supply system configurable to provide a flow of radiation-curable fluid into the vat through the one or more inlets.

In some embodiments, the control system may further be configured to provide a fluid supply signal for the supply system to provide a radiation-curably fluid at a variable flow rate, the radiation-curable fluid supply system being configured to increase and decrease the flow rate of radiation-curable fluid in response to a change in the fluid supply control signal indicating that an increase or decrease, respectively, may be required.

In some embodiments, the additive manufacturing apparatus may further comprising a radiation-curable fluid supply system operably coupled to the control system to receive the fluid supply control signal and to increase or decrease the flow rate of radiation-curable fluid into the vat in response to a change in the fluid supply control signal indicating that an increase or decrease, respectively, may be required.

In some embodiments, the radiation-curable fluid supply system may comprise a system of one or more outlets, forming inlets for feeding radiation-curable fluid into the vat, and the flow through said one or more outlets being controllable by the control system to increase or decrease the flow rate of radiation-curable fluid into the vat in response to a change in the fluid supply control signal indicating that an increase or decrease, respectively, is required.

In some embodiments, the system of one or more outlets comprises one or more outlets arranged in a bottom part of the vat, in a side wall of the vat, and/or one or more outlets arranged separate from the vat, such as above the vat.

In some embodiments, the radiation-curable fluid supply system may comprise a heater and/or a cooler for changing a temperature of the radiation-curable fluid to be resupplied into the vat by the radiation-curable fluid supply system.

In some embodiments, the build platform or the build platform may be a separate part removeably attachable to the vat.

In some embodiments, the build platform may comprises one or more holes for allowing radiation-curable fluid resupplied below the build platform to pass through at least a part of the build platform during building of the product.

In some embodiments, the curable radiation source may comprises a projector.

In some embodiments, the curable radiation source is moveable relative to the vat, and the additive manufacturing apparatus in configured to maintain a constant distance between the curable radiation source and the surface of the radiation-curable fluid during building of the product, or to set prior to printing the height of the curable radiation source, e.g. to optimize print resolution.

In other words, the control system is configured to provide a curing radiation pattern that selectively cures a part of the radiation-curable fluid surface in case said part coincides with a part of the planned geometry of the product.

The shape used for providing the dynamic characterization may be the shape of just a part of the surface. It needs not, and typically is not, the shape of the entire surface of the radiation-curable fluid.

The radiation-curable fluid is typically a resin, such as a commercially available resin.

In some embodiments, the curing radiation source is a projector, such as a DLP (Digital Light Processing) projector, an LED (Light-Emitting Diode) projector or an LCD (Liquid-Crystal Display) projector. The projector may for instance be a perspective projector, an orthographic projector or a laser point source configured to race a 2D pattern.

In some embodiments, the curing radiation source is one-dimensional, such as a laser. By moving the laser rapidly, an effectively two-dimensional pattern can be provided.

In some embodiments, the control system is configured to enable the platform stage to move continuously while the curing radiation source is curing radiation-curable fluid. The motion can be with a constant speed or with a variable speed. Contrary to current additive manufacturing apparatuses, embodiments of the present invention allow for continuous motion of the platform, yet achieving a good build quality mitigating issues of artifacts stemming from a stepwise layer-by-layer solidification. Platform speed can be used as a second control parameter. In this way, both platform speed and curing radiation pattern and intensity can be adjusted to provide the required curing. The precise method for doing this depends on the type of radiation-curable fluid used, its temperature, the frequency spectrum of the curing radiation source, and other factors.

In some embodiments, the characterization of the shape of the surface includes determining a topography of at least a part of the surface of the fluid. Topography is for instance a height of the radiation-curable fluid surface across the vat.

In some embodiments, the topography is determined by recording a plurality of two-dimensional images of reflected and/or emitted radiation from the surface of the radiation-curable fluid and determining surface height variations in the surface based on:
  intensity variations in one or more of the two-dimensional images, and/or
  temporal intensity variations in the two-dimensional images.

Intensity variations across an image can themselves represent a variation in surface height. Temporal changes in the same area from one image to the next can also provide useful information.

In some embodiments, the additive manufacturing apparatus may comprise a separate illumination source for providing radiation to be reflected by the surface of the radiation-curable fluid for the dynamic characterization of the shape of the surface. The curing radiation may itself be used for determining the shape of the surface, but a separate source provides extra flexibility.

The radiation sensor may instead, or additionally, be capable of sensing infrared radiation generated by a reaction process, such as an exothermal process, occurring as the radiation-curable fluid is being cured.

In some embodiments that comprise an illumination source in addition to the curing radiation source, the radiation sensor may comprise an optical filter configured to filter out radiation from the curing radiation source. This may provide a higher signal-to-noise ratio in the sensing of radiation originating from the illumination source, leading to a more precise characterization of the surface.

In some embodiments, the optical filter substantially only allows radiation from the illumination source to pass.

In some embodiments, the illumination source is configured to emit one or more two-dimensional illumination patterns comprising a set of one or more pattern features, and the control system is configured to determine a topography of the surface of the radiation-curable fluid at least based on how the one or more pattern features are reflected onto the sensor by the surface of the radiation-curable fluid.

In some embodiments, the characterization of the shape of the surface includes monitoring radiation reflected and/or emitted from a part of the surface, and wherein a motion of the build platform and/or the two-dimensional curing radiation pattern and/or the curing radiation intensity are adjusted in response to changes in the radiation reflected and/or emitted radiation said part of the surface.

In some embodiments, a motion of the build platform may be applied and/or the two-dimensional curing radiation pattern and/or the curing radiation intensity are adjusted to ensure that a local flow of radiation-curable fluid onto cured radiation-curable fluid is sufficient or increased for building a further part of the product in accordance with the planned geometry. If insufficient radiation-curable fluid is available at the surface, it will not be possible to cure further parts of the product in accordance with the planned geometry in such places. The term "sufficient" will, in light of the present disclosure, be clear to the person skilled in the art as being a functional term describing that enough radiation-curable fluid is available for proceeding with building the planned product, but not in excessive amounts, as this could prevent curing in accordance with the planned geometry.

In some embodiments, there is a second curing radiation source in addition to the already included ("first") curing radiation source described above. The second curing radiation source is configured to receive a second curing radiation source control signal and to emit a corresponding second two-dimensional curing radiation pattern in a direction towards the surface of the radiation-curable fluid. In some embodiments, the second curing radiation source emits the second two-dimensional curing radiation pattern in an at least partly non-overlapping fashion relative to the two-dimensional curing radiation pattern emitted by the first curing radiation source. Thereby, there is a non-overlapping surface part of the surface that receives curing radiation from the second curing radiation source, but not from the first curing radiation source. This allows easier building of larger products. In some embodiments, there is a second radiation sensor configured to produce a sensor signal representing radiation reflected by and/or emitted from the non-overlapping surface part of the surface. In some embodiment a plurality of curing radiation sources is used and each of those radiation sources is configured similar to the above.

According to further aspects, the invention provides a method for building a product by additive manufacturing in an additive manufacturing apparatus in accordance with any of the embodiments derivable from the present disclosure, wherein the method comprises:
  producing, using the radiation sensor, a sensor signal representing radiation reflected by and/or emitted from the surface of the radiation-curable fluid,
  providing a dynamic characterization of a shape of the surface of the fluid based on the sensor signal,
  retrieving a geometry information representing a planned geometry of the product being built,
  determining one or both of a curing radiation pattern and curing radiation intensity to be emitted by the curing radiation source in order to cure the radiation-curable fluid in accordance with the planned geometry, or a part thereof, the determining being based at least on the geometry information and the dynamic characterization of the shape of the surface, and then providing a corresponding curing radiation source control signal to the curing radiation source, and providing an inflow of radiation-curable fluid into the vat and or providing a platform stage control signal to a moveable platform stage to cause a motion of the build platform.

The considerations provided in connection with the first aspect of the invention apply similarly to the second aspect. For instance, the curing radiation pattern and/or intensity are adapted responsive to the sensor signal to cause curing of those parts of the radiation-curable fluid surface that coincide with a corresponding part of the planned geometry of the product. If a part of the surface does not coincide with the planned geometry, no radiation is provided to that part, or at least not enough for that part of the surface to cure.

Further, in some embodiments, of the method the build platform is stationary and in other the build platform moves. In the latter case, the build platform may comprise a platform stage for changing a position of the build platform relative to a surface of the radiation-curable fluid during building of the product, and the method may comprise providing the platform stage control signal to the platform stage to cause a motion of the build platform during building of the product.

It is noted that a combination of a moving build platform and supply of radiation-curable fluid is considered within the reach of the present invention.

In preferred embodiments, the method may further comprise providing a fluid supply control signal for a radiation-curable fluid supply system configurable to provide radiation-curable fluid at a variable flow rate, the radiation-curable fluid supply system being configured to increase and decrease the flow rate of radiation-curable fluid in response to a change in the fluid supply control signal indicating that an increase or decrease, respectively, is required.

A third aspect of the invention provides digital computing hardware or a computing hardware being at least partially analog configured to act as the control system in an additive manufacturing apparatus in accordance with an embodiment of the first aspect of the invention.

It is possible to use a control system with certain analog elements. For instance, an illumination source and a photodiode may be placed in such a way that a certain amount of radiation from the illumination source enters the photodiode when the surface is curved and a different amount, for instance less, enters when the surface is flat, or vice versa. The current signal from the photodiode is subtracted from a set point. The difference is an error signal that can be fed into a feedback controller that produces a control signal that controls an intensity of the curing radiation source. This is mostly useful for products having a quite simple planned geometry.

A fourth aspect of the invention provides a computer-readable medium comprising instructions which, when executed on suitable computing hardware in an additive manufacturing apparatus in accordance with the first aspect of the invention, enables the additive manufacturing apparatus to perform steps i) to iv).

BRIEF DESCRIPTION OF THE DRAWINGS

The present invention and in particular preferred embodiments thereof will now be disclosed in greater details with reference to the accompanying figures in which.

DETAILED DESCRIPTION OF SELECTED EMBODIMENTS

Figure 1A:
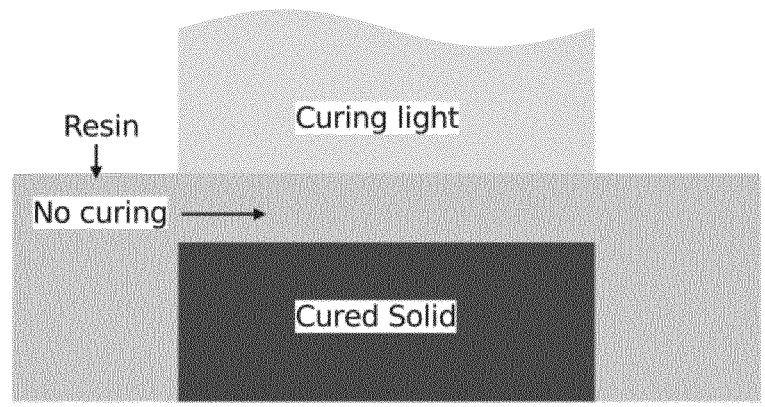
FIGS. 1a, 1b and 1c illustrate resin curing at different curing radiation intensities.
Figure 1B:
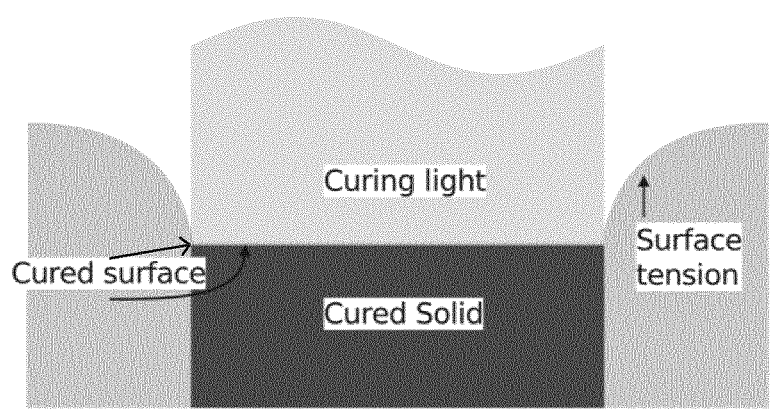
Figure 1C:
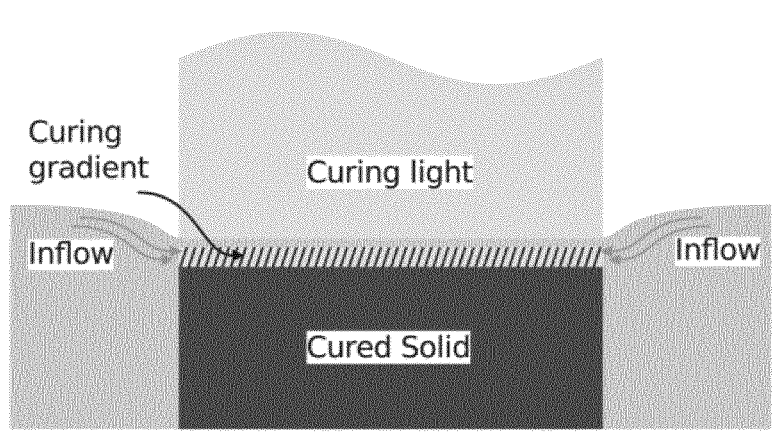

FIGS. 1a-1c illustrate differences in the build result obtained for three different curing rates (how fast the fluid goes from non-cured to cured) resulting from different curing radiation intensities. In FIG. 1a, the curing rate is too low for building a continuous product geometry in the illustrated region. This may have been caused by adding too much radiation-curable fluid at a too high a rate, and/or a platform on which the product is being built moves too fast and thus submerges the work piece surface too much. As a result, the curing light is not sufficient for producing solidified material.

FIG. 1b illustrates a situation where the curing rate in the region is so high that fluid resin is not able to re-cover the solidified parts via an inflow of resin. This is due to resin being cured as it enters the radiation area, and in some cases it is due to surface tension caused by the fluid-solid interface. The result, illustrated in FIG. 1b, is that either effect creates large surface height variations. These eventually make it impossible for resin to re-cover the necessary parts, and it makes for an uncontrollable process. The resulting products are not likely to match the product as intended.

FIG. 1c illustrates a desirable curing rate where surface wetness is maintained, allowing new resin to flow over the solidified parts. Curing radiation intensity and supplying of radiation-curable fluid into the vat are properly balanced, or in some embodiments, build platform downward speed and curing radiation intensity are properly balanced. The product is built quickly, some parts even continuously, perhaps with occasional stoppages in the supplying of radiation-curable fluid, and in accordance with the desired product shape. A "curing gradient" may provide a gradual solidification, whereby overexposure is avoided.

Figure 2:
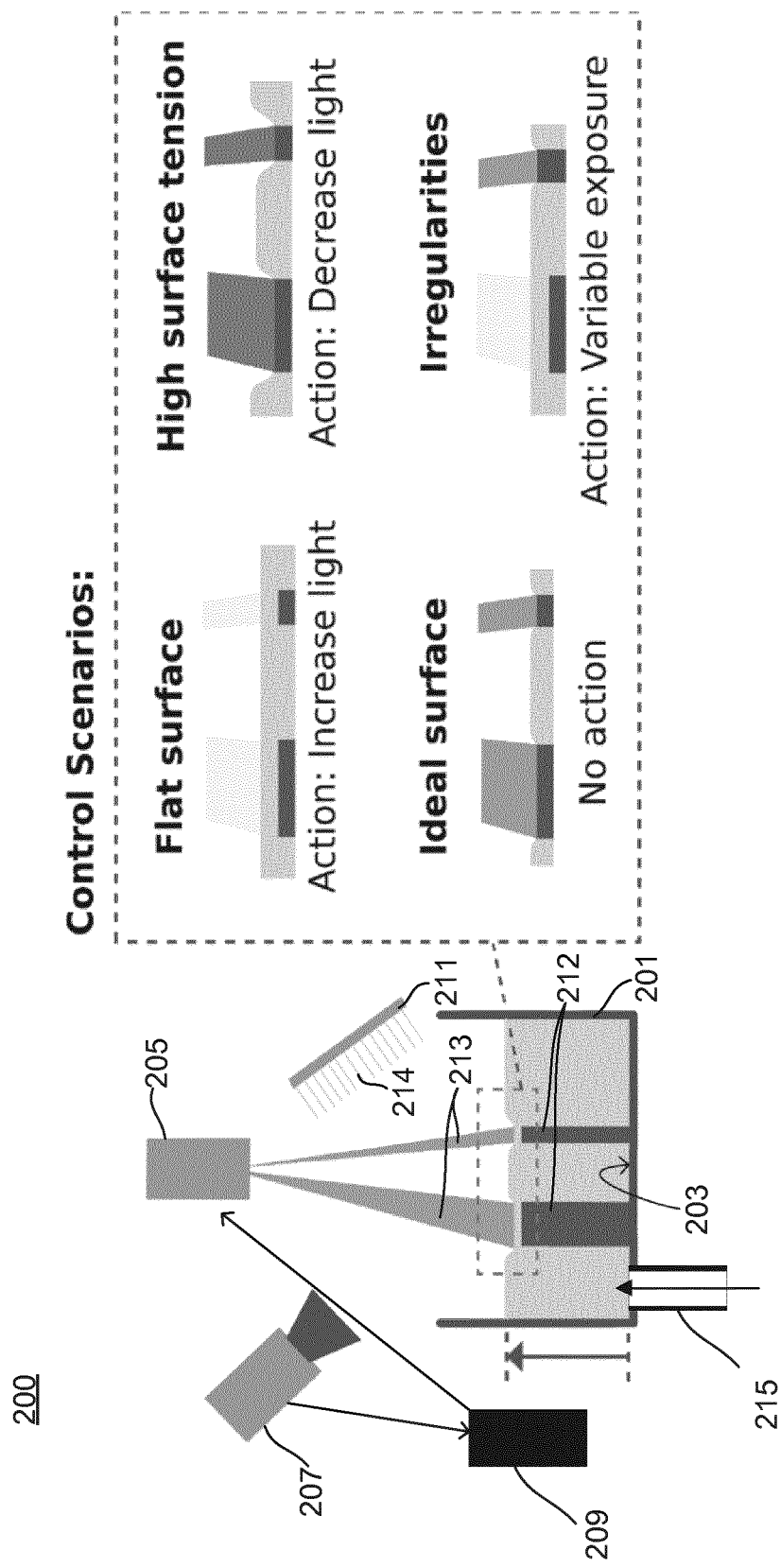
FIG. 2 illustrates an additive manufacturing apparatus in accordance with an embodiment of the present invention.
Figure 14:
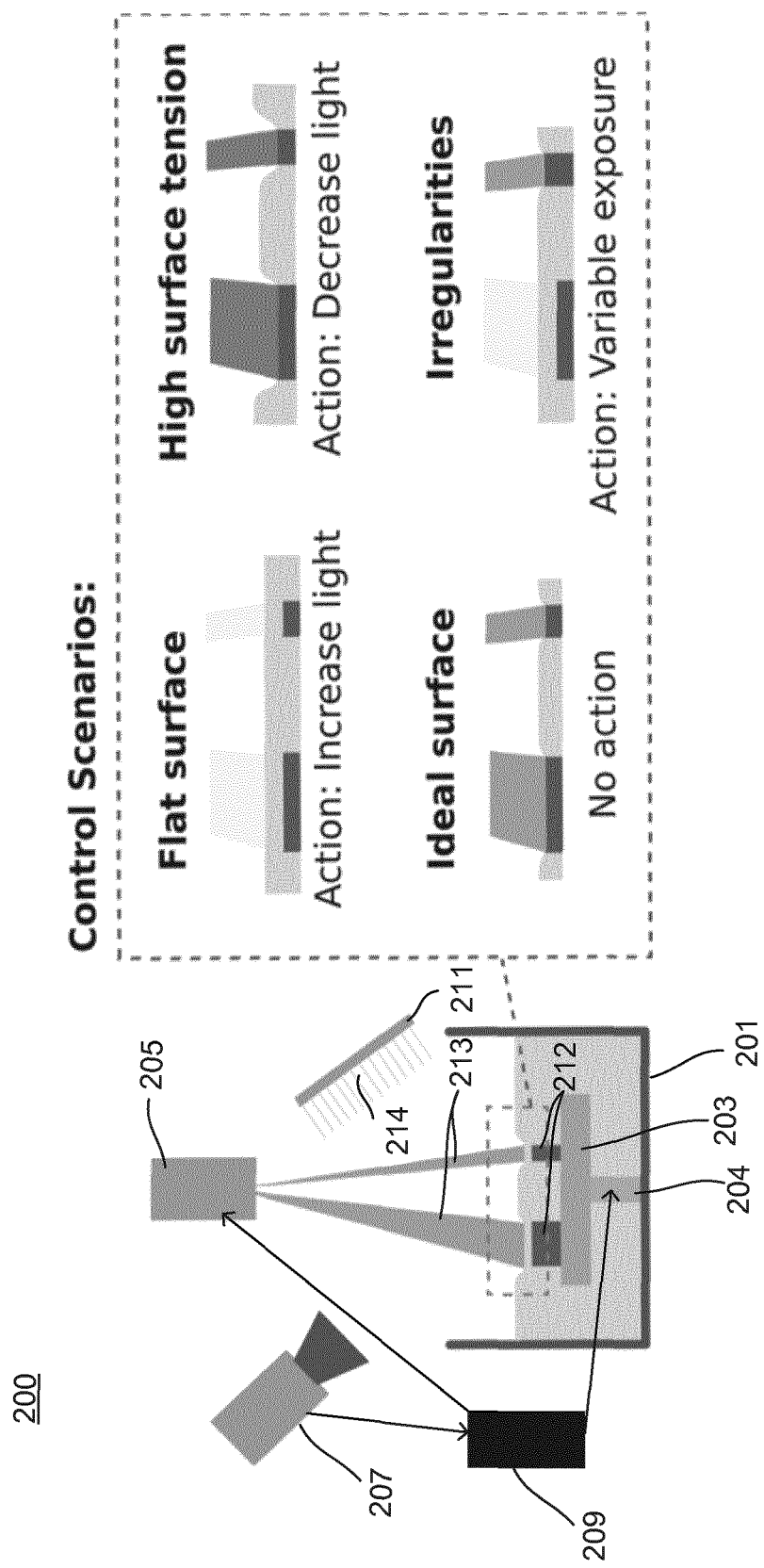
FIG. 14 illustrates a variation of the additive manufacturing apparatus of FIG. 2, in accordance with a further embodiment of the present invention.

FIG. 2 and FIG. 14 illustrate a schematic illustration of an additive manufacturing apparatus 200. The additive manufacturing apparatus 200 comprises a vat 201, a build platform 203, which in this example is simply the bottom of the vat or a removable element arranged on or at the bottom of the vat as best seen in FIG. 2. Alternatively or in addition thereto, the build plat form 203 may be movable using a motorized stage 204, as best seen in FIG. 14. The additive manufacturing apparatus 200 further comprises a controllable electromagnetic radiation source 205 emitting radiation 213 that cures surface parts of the radiation-curable fluid in the vat to form solidified parts 212 that make up the product. In this example, the controllable radiation source is a projector having an ultra-violet LED (light emitting diode) light engine. The additive manufacturing apparatus also comprises an inlet 215 for inletting radiation-curable fluid into the vat.

The additive manufacturing apparatus in FIG. 2 comprises three additional elements:
1. An optional illumination source 211 for providing radiation 214 specifically for use in the dynamic characterization of the surface of the radiation-curable fluid.
2. A radiation sensor 207 for measuring radiation from the surface.
3. A control system 209 for receiving a sensor signal from the sensor 207 and in response determining control signals for the curing radiation source 205 and/or for a motorized stage 204 of a platform 203 and/or for a fluid supply system to be connected to the vat and the control system. The control system is then configured to ensure that the product is built correctly, continuously (if possible), and quickly.

The fluid supply system feeds radiation-curable fluid into the vat through the inlet 215.

It is noted that in some embodiments, the fluid supply system is a system that provides a constant flow rate of radiation-curable fluid, e.g. embodied as a container in fluid connection through a shut-off valve with the vat and where the gravity provides the flow of radiation-curable fluid. In such and other cases, the control signal to the fluid supply system may be a signal opening and closing for the flow of radiation-curable fluid e.g. by an opening signal to the shut-off valve when the manufacturing process begins and a close signal to the shut-off valve when the manufacturing process end.

Changes in the surface shape during building is of particular interest in the present invention when solidification is taking place and the upper surface of the radiation-curable fluid is moving, generally upwardly, and/or when a build platform is moving, generally downward, so as to successively submerge the product as it is build. In the prior art, the surface of the resin should be flat, as this is the only way to make sure the curing radiation provided by the curing radiation source has the intended curing effect. Accordingly, there is no need for an active monitoring of the surface, since the means for obtaining a level surface are considered sufficient and acceptable. Therefore, the required radiation patterns can be precomputed for all layers based on the knowledge that the resin surface is (virtually) flat.

The optical vision system comprising the illumination source and the radiation sensor feed information to the control system. The projector curing radiation intensity and projected pattern are adjusted based on the input from the optical vision system in a closed loop. When too little curing radiation cures the surface, the fluid resin is measurably flat and thus the control system would proceed to increase the curing radiation intensity. When too much curing radiation is used, high surface deformation is observed due to, among other things, surface tension. In that case, the control system preferably proceeds to reduce the curing radiation intensity. When the control system is in an optimal steady state of operation, the fluid surface is curved, but only slightly (as in FIG. 1*c*), and there is a balance between radiation intensity and feeding of radiation-curable fluid to the solidification layer, e.g. by a downward motion of a build platform and/or supply of radiation-curable fluid into the vat. When using a projector as a curing radiation source, as in the present example, the radiation intensity changes can be performed on a pixel-by-pixel basis in order to find the optimal curing radiation intensity for the features that make up the final product.

The detail on the right-hand side of FIG. 2 illustrates the steps that are taken in the various build scenarios. The present example assumes that the flow rate of radiation-curable fluid into the vat is constant. Thus, the right-hand side detail in FIG. 2 does not illustrate changes applied to the flow rate in response to changes in the pattern measured by the radiation sensor.

Figure 3:
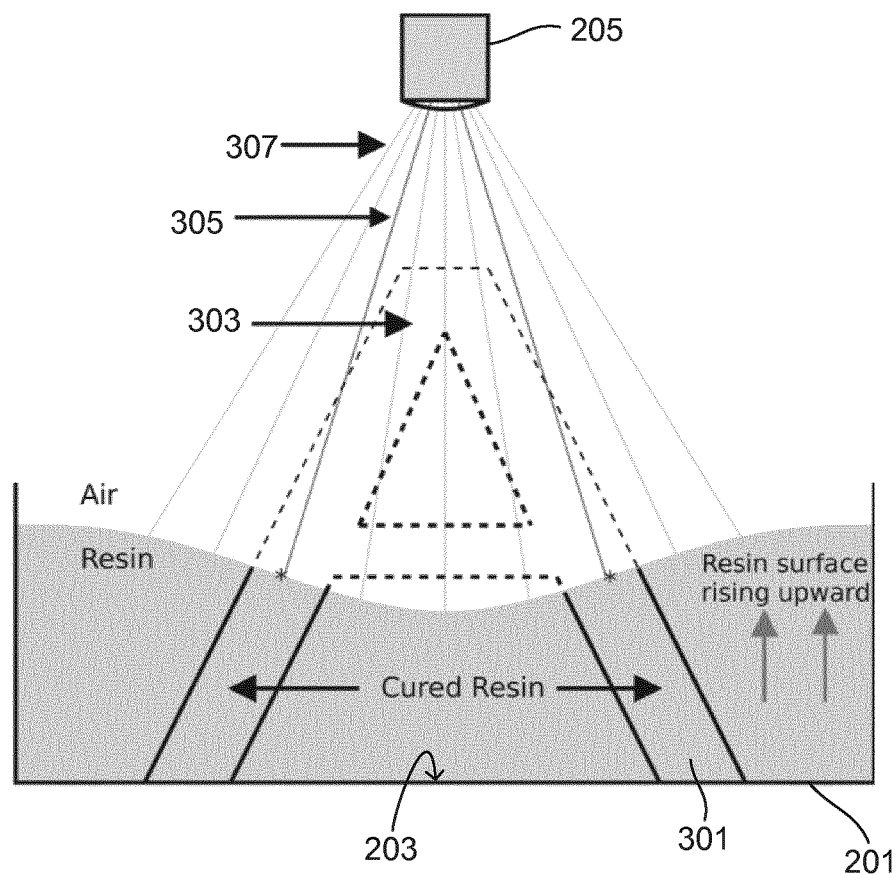
FIG. 3 illustrates a working principle underlying the present invention.

FIG. 3 illustrates partly a principle behind the solution provided by the inventors. (Note that FIG. 3 is merely for illustrating the principle) Contrary to existing methods, the present invention works even if the fluid surface is not planar during the build process. In previous solutions, any deformation of the resin surface would affect the print quality adversely, as discussed above. The inventors realized that if the surface topography is known, it is possible to only solidify resin in the locations where solidification should occur, even with a curved resin surface. If the intersection of a projected pixel ray and the resin surface lies within the 3D model geometry of the product (the planned geometry), then that pixel is illuminated. If there is no intersection between the surface and the 3D geometry of the product, that pixel is turned off, or its intensity at least reduced to a sufficiently low level to avoid solidification.

Figure 15:
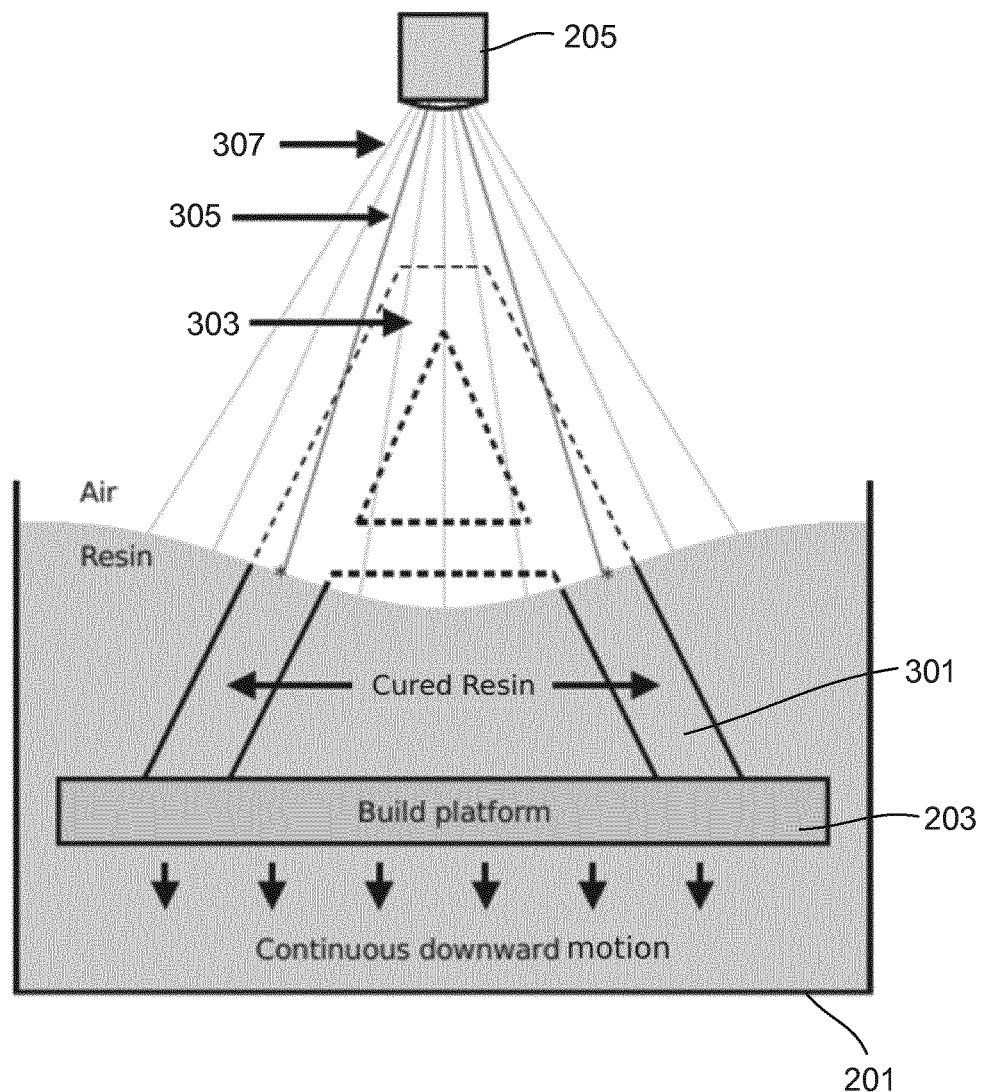
FIG. 15 illustrates a variation of the working principle of FIG. 3.

In particular, FIG. 3 and FIG. 15 illustrate a building process where a product part 301 below the resin surface has been solidified. A Part 303 (shown "above" the resin surface) has not yet been manufactured, but should be in order to form the illustrated "A"-shaped product. The resin surface is not planar, so under normal circumstances, a product of very low quality would result from such a build process.

To ensure that a local flow of radiation-curable fluid onto cured radiation-curable fluid is sufficient for building a further part of the product in accordance with the planned geometry, for instance as illustrated in FIG. 3 and FIG. 15, a rate of addition of radiation-curable fluid and/or a motion of the build platform and/or the two-dimensional curing radiation pattern and/or the curing radiation intensity are preferably dynamically adjusted. For instance, if a large area is cured, more time may be required to allow radiation-curable fluid to cover the cured area and a slowdown of feeding radiation-curable fluid to the solidification layer may be required as e.g. controlled by the fluid supply control devices and/or a platform positioning device. As another example, if the curvature of part of the surface increases, this might indicate that the curing radiation intensity is too high. A reduction of the curing radiation intensity may be required. The control system is configured to ensure that the control parameters described above are adapted properly.

In FIG. 3, arrow 305 illustrates a ray that ends at the resin surface in a point at which resin should be solidified, since the planned geometry intersects the surface of the resin; in other words, this point is contained within the product part 303 to be manufactured. Accordingly, the projector 205 should provide curing radiation at that point to ensure that this part of the product is ultimately built. The projector 205 in FIG. 3 is a perspective projector. An orthographic projector could also be used. This has the advantage that at high surface curvatures where the perspective projector might be shadowed by curving resin (due to surface tension), the orthographic projector can mitigate this problem.

Ray 307 illustrates a radiation path along which there should not be any radiation. The ray traces to a part of the resin surface at which there is no intersection between the resin surface and the product to be built. Therefore, the projector should not provide curing radiation to that part.

In a sense, the invention employs what may be thought of as an adaptive curing radiation pattern determination, adapting the curing radiation source pattern or intensity to compensate for height differences in the resin surface. As described above, the adaptation of the curing radiation pattern is performed on a ray-by-ray basis, dynamically adjusting the projected pattern in such a way that when the radiation reaches the (potentially curved) resin surface, the radiation cures the desired fluid resin in accordance with the planned geometry, even if the resin surface is not planar.

In some embodiments, the control system simply measures the intensity reflected from a prototype geometry added next to the actual product to be manufactured. This could for instance be a bar or rod (which are structures that have a constant cross sectional area during the build). The overall intensity of the projected image is changed in response to changes in the size or total intensity reflected from this prototype geometry.

To adapt the curing radiation pattern, it is necessary to estimate the shape of the surface. Surface estimation can be obtained using methods such as, but not limited to: shape from shading, photometric stereo, structured light, depth from defocus, deflectometry, and interferometry.

Figure 4B:
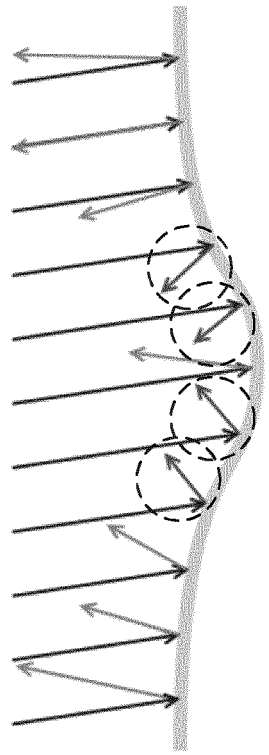
FIG. 4b schematically illustrates ray reflections from a distorted, non-flat resin surface.
Figure 4A:
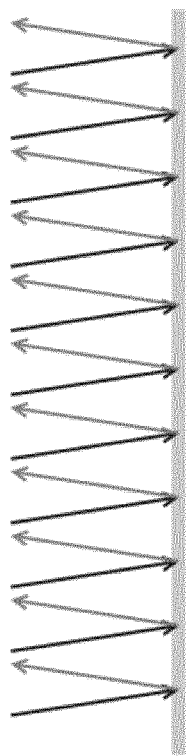
FIG. 4a schematically illustrates ray reflections from a flat resin surface.

In the present embodiment, the arrangement of the illumination source 211 relative to the vat and the radiation sensor 207 shown in FIG. 2 is such that the illumination source's specular reflection in the resin can reach the sensor 207, which is necessary for the feedback control. When the fluid resin is undisturbed, as shown in FIG. 4a, the surface is mirroring a part of the radiation from the illumination source 211 onto the radiation sensor 207. Surface deformations, for instance due to the solidification process or other effects, will cause a redirection of part of the radiation from the illumination source such that it does not enter the sensor 207, and will also cause the reflected image of the illumination source to be distorted compared to that emitted by the illumination source. Thus, one measure of the surface deformation involves determining seemingly non-illuminated region in the resin, at least as recorded by the sensor. This is illustrated in FIG. 4b. The circled arrows have directions that are not directed into the sensor. In the schematic, only a single ray reaches the sensor from the deformed region.

Accordingly, this region will generally appear relatively dark compared to its surroundings. The size of the dark area is related to the deformation of the surface. Using the sensor signal as feedback, one way of maintaining a high quality, high speed, continuous build process includes adjusting the radiation image intensity and/or the supplying of radiation-curable fluid and/or the platform speed in such a way that the dark area is present, but relatively small, and of a substantially constant size. The presence of the dark area means that there is an unevenness in the surface. Its relatively small size is acceptable. The constant size during building is a sign that the balance between solidification and inflow of fluid resin is optimal or near optimal.

Figure 5:
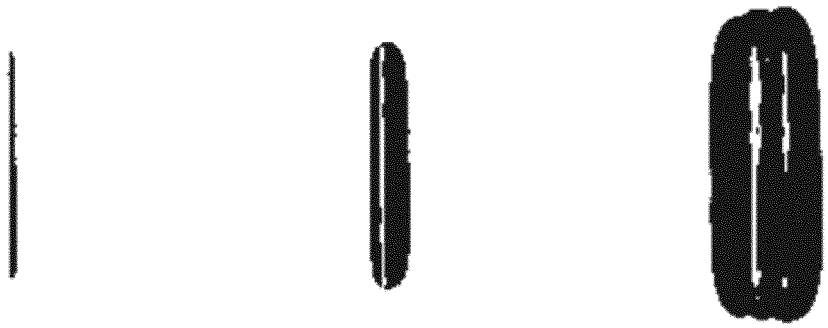
FIG. 5 illustrates thresholded binary images of diffused light reflected from the resin surface under various curing radiation intensities.
Figure 6:
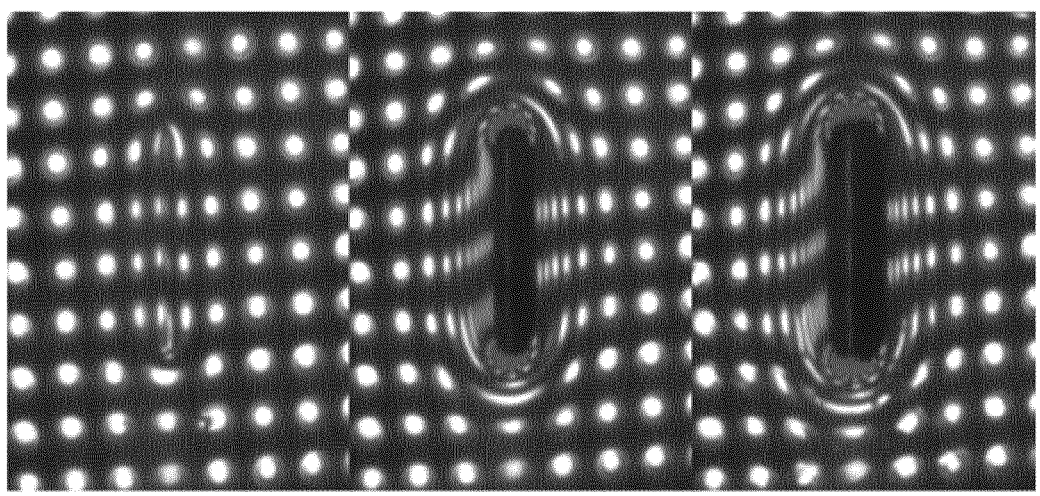
FIG. 6 illustrates images of patterned light reflected from the resin surface under various curing radiation intensities.

In FIG. 5 and FIG. 6, a rectangular bar, described above, having cross-sectional dimensions 0.5×10 mm is printed as an addition to the actual product. FIG. 5 illustrates specular reflection when a diffused light source is used as illumination source. FIG. 6 illustrates the specular reflection of a patterned illumination source from the surface.

In FIGS. 5 and 6, curing radiation intensity increases from left to right. An increase in radiation intensity leads to a higher curvature over a larger area (see also FIG. 1b), which FIG. 5 and FIG. 6 also clearly show. Note that an intensity thresholding operation is performed on FIG. 5, resulting in a binary image representation separating flat regions from curved regions. Pixels are given a value of '0' if they fall below the threshold intensity value. These pixels are then classified as representing curved geometry. Pixels above the threshold intensity value are given a value of '1'. These pixels are then classified as representing flat geometry. The number of pixels with the value '0', that is, the pixels representing curved parts, are counted and represent the area of the curved part. This number can be used as an error signal relative to a fixed desired area.

FIG. 6 is the result of using a two-dimensional pattern to characterize the surface. FIG. 6 illustrates a pattern comprising lit LEDs arranged in a rectangular grid. This is merely for illustration purposes only, as it makes it easy to get a sense of the shape of the surface. The pattern is recorded by a two-dimensional sensor. Because the emitted pattern is known, it is possible to calculate the shape of the surface in great detail. Sinusoidal fringe patterns, as commonly used in three-dimensional scanning, provide significantly better resolution in this context compared to the simple example in FIG. 6 (but would not be easily recognized in a figure). Based on the principle shown in FIG. 3, the projector image is adjusted to take the determined shape into account.

Figure 7:
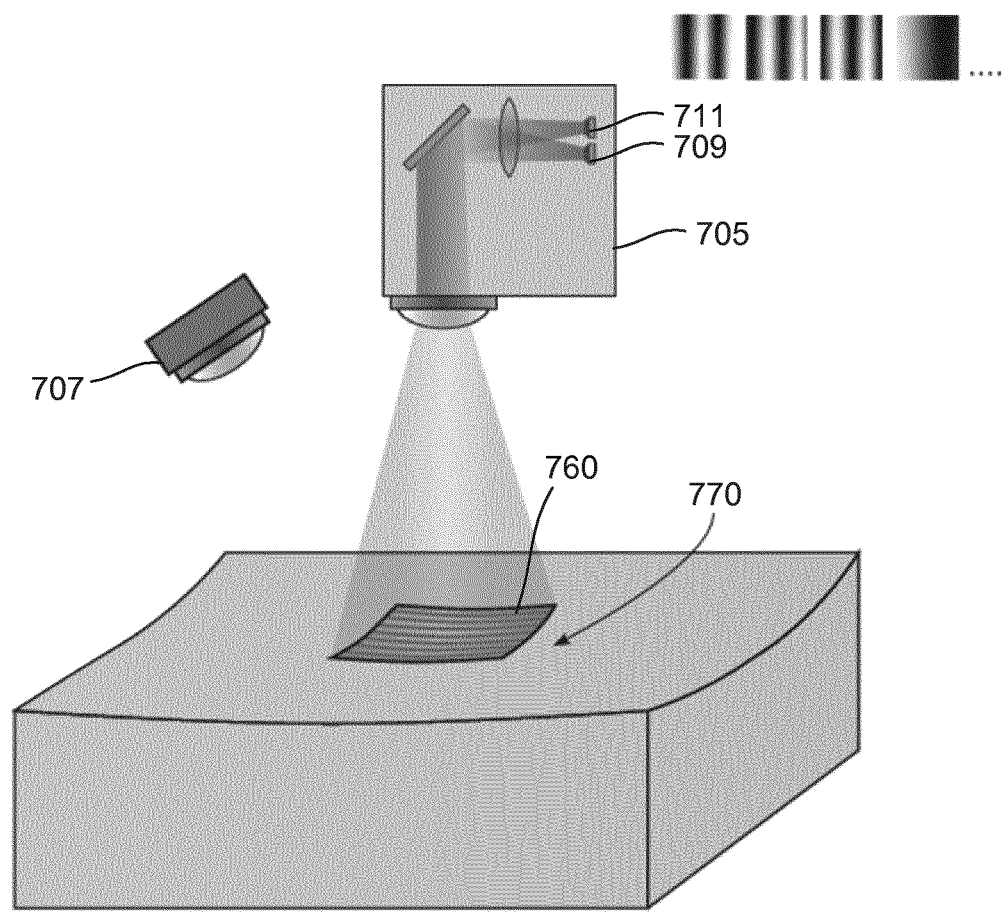
FIG. 7 illustrates the use of patterned light for obtaining information about the shape of the resin surface.

FIG. 7 illustrates schematically the use of an illumination source 711 that provides one or more two-dimensional patterns 760 on the surface 770 of the radiation-curable fluid. Element 709 provides curing radiation. In this example, the projector 705 that provides curing radiation during the manufacturing of the product also comprises the illumination source 711, but whether the illumination source is built into the curing radiation source or not is optional. A radiation sensor 707 monitors the area (or a part of the area) of the surface illuminated by the illumination source 711.

FIG. 6 illustrated the use of a single two-dimensional pattern for dynamic characterization of the shape of the surface of the radiation-curable fluid during building. FIG. 7 schematically illustrates a series of patterns (above reference number 711) that might be used for performing a dynamic three-dimensional characterization of the surface of the radiation-curable fluid during building. As is well known from the field of three-dimensional scanning, use of such patterns can provide a high-resolution three-dimensional characterization. In the context of the present invention, this can translate into a more precise dynamic adjustment of the projected curing radiation pattern during the building of a product. This is in turn translated into products that are even more true to the planned geometry.

Figure 8:
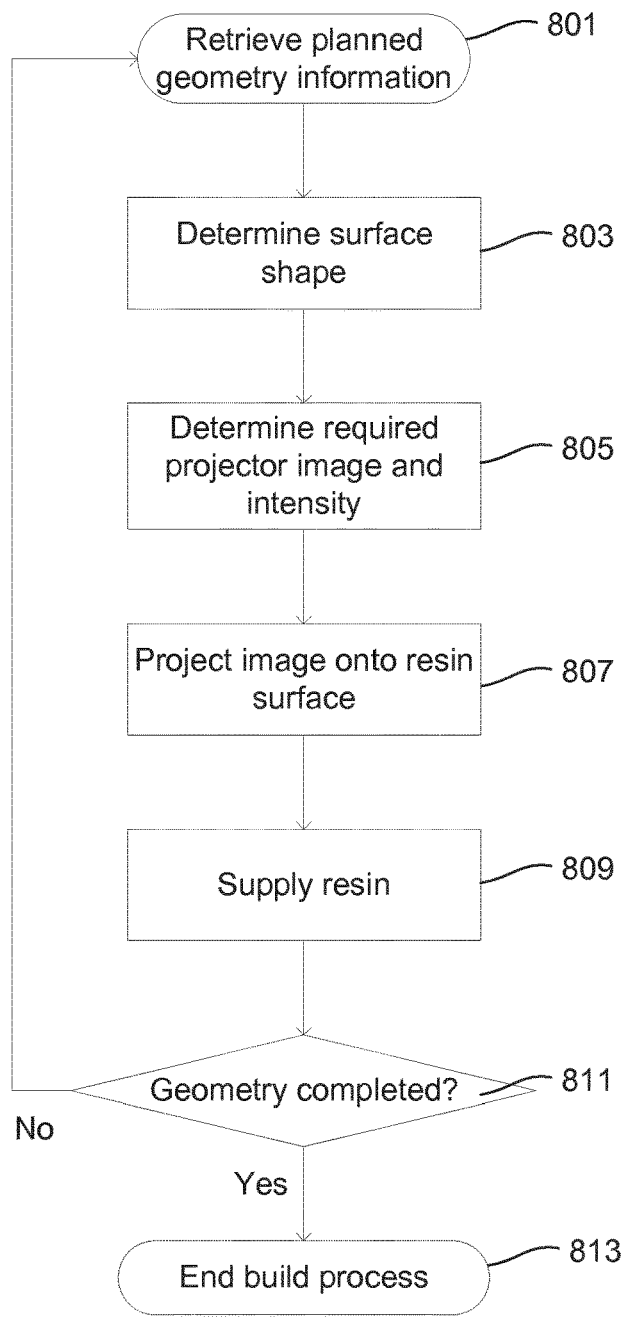
FIG. 8 is a flow chart that illustrates an additive manufacturing process in accordance with an embodiment of the present invention.

FIG. 8 illustrates a method 800 in accordance with an embodiment of invention for building a product using additive manufacturing. To build the product, geometry information of the planned product is retrieved in step 801. As described previously, the surface of the resin might not be, and preferably is not, completely flat during the build process when embodiments of the present invention are used. The method therefore includes determining the shape of the surface of the resin in step 803. Based on the geometry information and the determined shape of the surface of the resin, the method determines, in step 805, a projector image and intensity required to solidify material that should be solidified in order for the planned product to be realized. The determined image is then projected onto the resin surface, in step 807. During the building, radiation-curable fluid is fed to the solidification layer, e.g. by supplying radiation-curable fluid as illustrated by step 809 or by moving a build platform or any other suitable feed control mechanism, such as discussed before. The feeding of radiation-curable fluid to the solidification layer is advantageously and preferably performed continuously in the process, e.g. at a variable amount/rate, for example by moving a platform at a variable speed and/or supplying resin at a varying flow rate, possibly with occasional stops, if required. However, generally, the adaptation of images in step 805 typically makes it possible to perform a mostly continuous feeding of fluid to the solidification layer. It is clear to the person skilled in the art, based on the present disclosure, that some of the steps can be performed in a different order, some perhaps simultaneously. For instance, the supplying of radiation-curable fluid in step 809 might be performed closer to or simultaneously with the step of determining the required curing radiation pattern, 805. As another example, some step might be undertaken at partly overlapping times. The step 807 of curing radiation-curable fluid might be performed at the same time that radiation-curable fluid is added to the vat. In step 811, it is determined whether the product is completed. If yes, the build process ends in step 813. If not, the method retrieves new geometry information representing further parts of the product to be built by returning to step 801.

Figure 9:
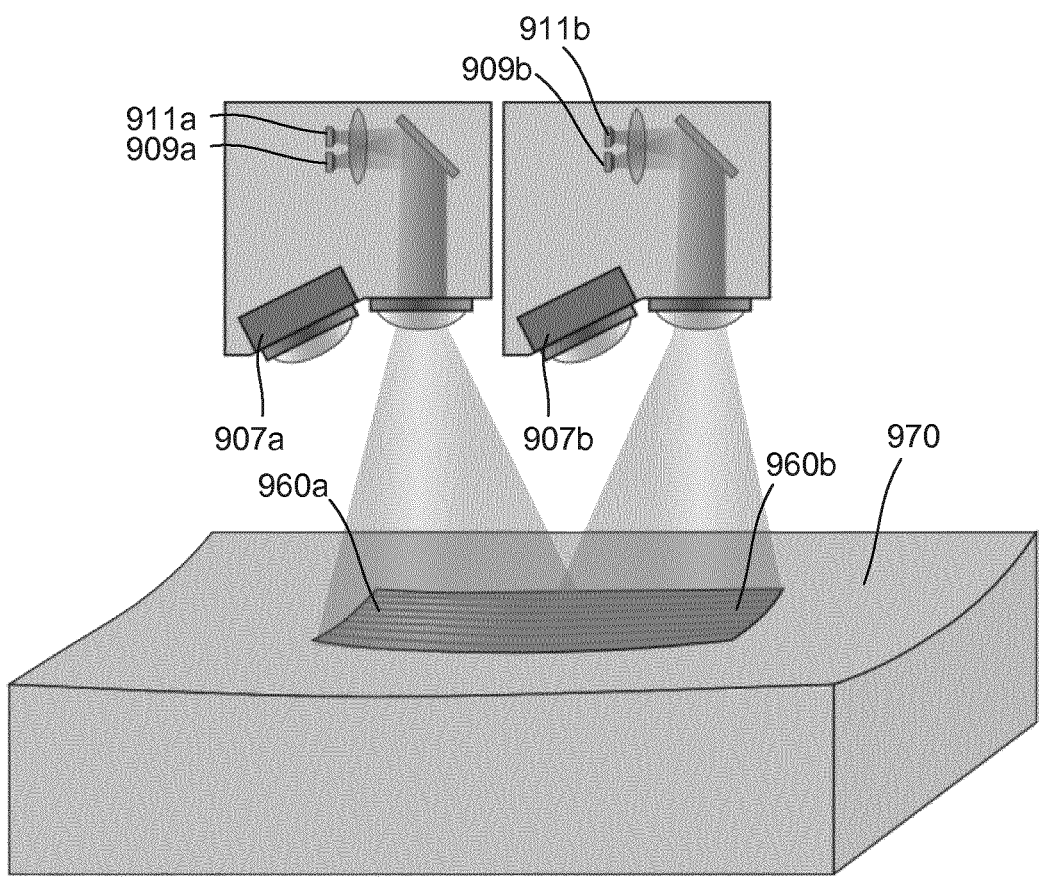
FIG. 9 illustrates the use two curing radiation sources, two illumination sources and two radiation sensors.

FIG. 9 illustrates schematically the use of two curing radiation sources 909a and 909b providing at least partly non-overlapping curing radiation patterns on the surface 970 of the radiation-curable fluid. This allows for parallel production, for instance to manufacture larger products. The additive manufacturing apparatus in FIG. 9 further comprises two illumination sources 911a and 911b associated with each of the curing radiation sources 909a and 909b. Each illumination source illuminates a corresponding region 960a and 960b of the surface 970 of the radiation-curable fluid. The apparatus furthermore comprises two radiation sensors monitoring the region associated with each of the illumination sources 911a and 911b.

Figure 10:
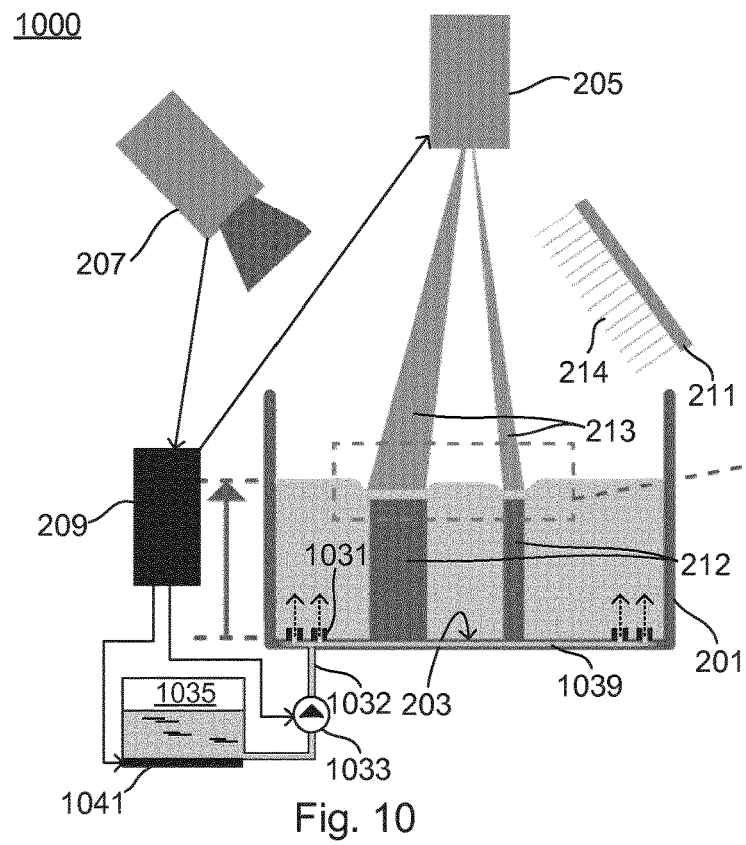
FIG. 10 illustrates an additive manufacturing apparatus in accordance with an embodiment of the present invention, employing a radiation-curable fluid supply system.

FIG. 10 illustrates an embodiment 1000 of the invention in which the vat 201 is combined with a radiation-curable fluid supply system. The radiation-curable fluid supply system comprises a number of outlets 1031 forming inlets to the vat and arranged in a bottom part of the vat. The outlets disclosed herein may be embodied as an end of a pipe or be given a geometrical progression in flow-vise direction to form a nozzle of diffuser to e.g. introduce the fluid as a jet or as an diffused fluid flow. A pump 1033 pumps radiation-curable fluid from a reservoir 1035 and provides it into a cavity 1039 in the bottom of the vat via a tube or pipe 1032. During the pumping, radiation-curable fluid is introduced into the vat via the outlets 1031. The pump 1033 is controlled by the control system 209 to introduce radiation-curable fluid into the vat at the required flow rate. The cavity 1039 could be built into the vat as such. Alternatively, it could be provided using a two-part system where a lid comprising the outlets 1031 is attached onto the bottom of the vat and lid is attached to the bottom of the vat and sealed using a sealant. In the latter case, the bottom recess illustrated in FIG. 10 is advantageously not provided, but the lid instead arranged onto a flat level bottom part of the vat. This allows for easy retrofitting of existing, compatible vats.

The reservoir 1035 in FIG. 10 also comprises a heater 1041, which can be used to change the temperature of the fluid in the reservoir. This in turn may change the viscosity of the fluid in the reservoir. The heater 1041 may or may not be controlled by the control system. FIG. 10 illustrates that the control system at least partly controls the heater 1041.

Figure 11:
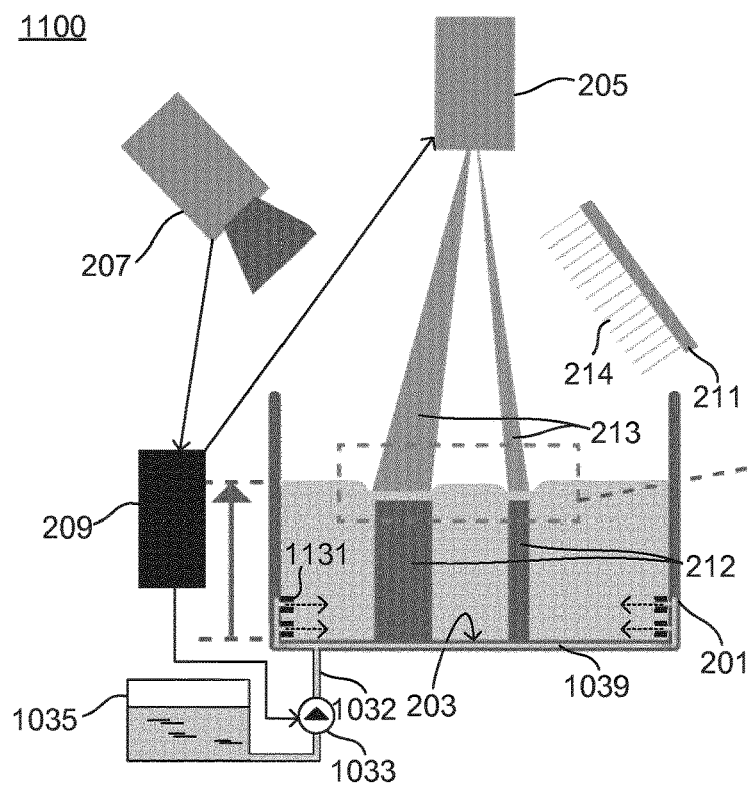
FIG. 11 illustrates another additive manufacturing apparatus in accordance with an embodiment of the present invention, employing a radiation-curable fluid supply system.

FIG. 11 illustrates another embodiment 1100 of the invention in which the vat 201 is combined with a radiation-curable fluid supply system. The radiation-curable fluid supply system comprises a number of outlets 1131 arranged in a side wall of the vat. A pump 1033 pulls radiation-curable fluid from a reservoir 1035 and provides it into a cavity in the bottom of the vat, for instance as described in relation to FIG. 10. During the pumping, radiation-curable fluid is introduced into the vat via the outlets 1131. The pump 1033 is controlled by the control system 209 to introduce additional radiation-curable fluid into the vat at the required flow rate.

Figure 12:
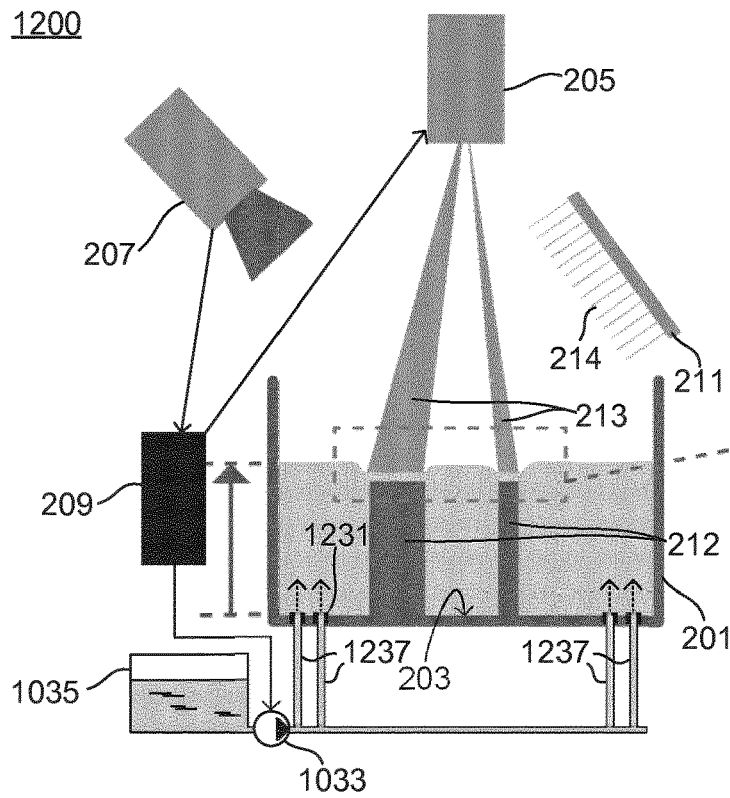
FIG. 12 illustrates another additive manufacturing apparatus in accordance with an embodiment of the present invention, employing a radiation-curable fluid supply system.

FIG. 12 illustrates another embodiment 1200 of the invention in which the vat 201 is combined with a radiation-curable fluid supply system. The radiation-curable fluid supply system comprises a number of outlets 1231 arranged in the bottom of the vat and fitted with corresponding tubes or pipes 1237. A common pump controlled by the control system 209 resupplies radiation-curable fluid to the vat 201 via the tubes or pipes 1237.

Figure 13:
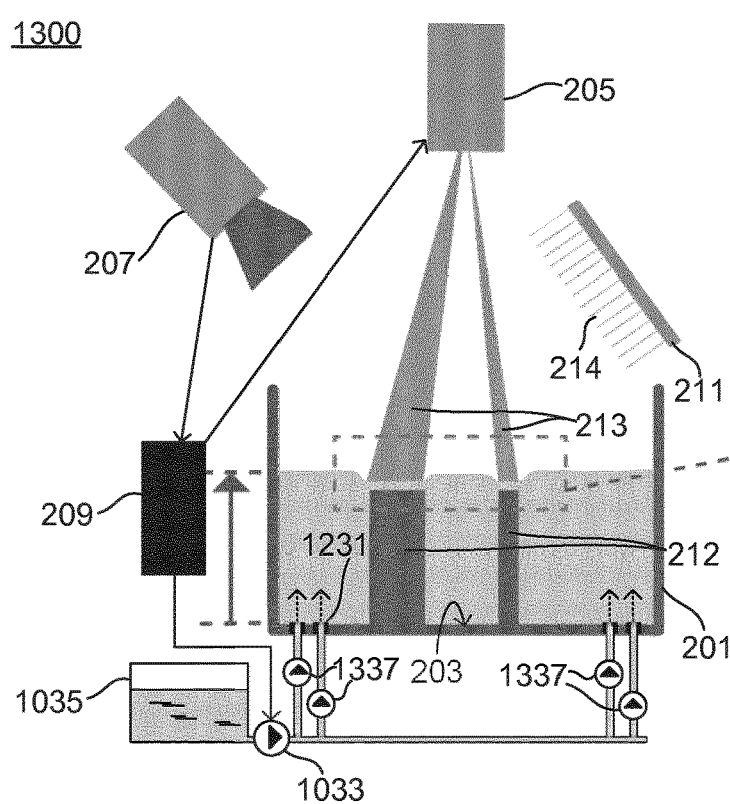
FIG. 13 illustrates another additive manufacturing apparatus in accordance with an embodiment of the present invention, employing a radiation-curable fluid supply system.

FIG. 13 illustrates another embodiment 1300 of the invention in which the vat 201 is combined with a radiation-curable fluid supply system. The radiation-curable fluid supply system comprises a number of outlets 1231 similar to those in FIG. 12. They are connected to a reservoir 1035 of radiation-curable fluid via tubes or pipes. In the present example, each tube or pipe is fitted with a separate pump or valve 1337. One or more of these valves or pumps (or combination of valves and pumps) are controlled by the control system 209. This allows for providing radiation-curable fluid into the vat 201 in a deliberately uneven manner. Perhaps a larger inflow is required at a particular part of the product, or perhaps it is advantageous in a given case to provide fluid from a particular direction because of a particular shape of the surface.

If pumps are used on the individual pipes or tubes, the pump 1033 might not be required. However, this is a matter of design.

The invention claimed is:

1. Additive manufacturing apparatus for building a product according to a planned geometry by successive solidification of a radiation-curable fluid in a layer where solidification takes place during processing in a continuous solidification mode, the layer extending in a vertical direction from a fluid surface of the radiation-curable fluid to a work piece surface of the product, the apparatus comprising:
   a vat for holding the radiation-curable fluid;
   a work piece support for holding the product during building;

a feed control mechanism adapted for controlling feeding of radiation-curable fluid to the layer where solidification takes place during processing in the continuous solidification mode;

a curing radiation source adapted for generating a two-dimensional exposure pattern of curing radiation in the layer where solidification takes place during processing, wherein the exposure pattern is defined by a curing radiation pattern geometry and/or curing radiation intensity;

a radiation sensor arranged to receive radiation from the layer where solidification takes place during processing, wherein the radiation sensor is configured to generate a sensor signal comprising information indicative of a solidification process status based on the received radiation; and a control system communicatively connected to the feed control mechanism and the curing radiation source, the control system being adapted to receive the sensor signal, and to adjust process control parameters controlling the solidification in the layer where solidification takes place during processing, in response to said sensor signal, wherein the process control parameters include one or more of an amount and a rate of feeding radiation-curable fluid to the layer where solidification takes place during processing by the feed control mechanism.

2. Additive manufacturing apparatus according to claim 1, wherein the radiation sensor is adapted to collect radiation from at least one location on the surface of the layer where solidification takes place during processing, the radiation comprising surface shape information for said location; and wherein the radiation sensor is configured to develop the sensor signal based on said surface shape information.

3. Additive manufacturing apparatus according to claim 2, wherein the radiation sensor is adapted to map topography information of at least parts of the surface of the layer where solidification takes place during processing in the continuous solidification mode; and wherein the radiation sensor is configured to develop the sensor signal based on said topography information.

4. Additive manufacturing apparatus according to claim 2, wherein the process control parameters include one or more of an amount and a rate of feeding radiation-curable fluid to the layer where solidification takes place during processing by the feed control mechanism.

5. Additive manufacturing apparatus according to claim 1, wherein the radiation sensor is adapted to map topography information of at least parts of the surface of the layer where solidification takes place during processing; and wherein the radiation sensor is configured to develop the sensor signal based on said topography information.

6. Additive manufacturing apparatus according to claim 5, wherein the process control parameters include one or more of an amount and a rate of feeding radiation-curable fluid to the layer where solidification takes place during processing by the feed control mechanism.

7. Additive manufacturing apparatus according to claim 1, further comprising fluid control devices, and wherein the control system is configured to operate said fluid control devices so as to adjust a level of the radiation-curable fluid in the vat in response to the sensor signal.

8. Additive manufacturing apparatus according to claim 7, wherein the fluid control devices include one or more inlet valves, one or more pumps, and/or one or more displacement mechanisms adapted to displace a volume of radiation-curable fluid in the vat.

9. Additive manufacturing apparatus according to claim 1, further comprising positioning devices arranged to control a position of the product in the vat, and wherein the control system is configured to adjust a vertical position or rate of motion in a vertical direction of the work piece support in the vat so as to adjust a submersion of the work piece surface below the surface of the radiation-curable fluid, thereby controlling inflow of radiation-curable fluid from the vat reservoir to the layer where solidification takes place during processing.

10. Additive manufacturing apparatus according to claim 1, wherein the process control parameters include one or more of a curing radiation pattern and a curing radiation intensity.

11. Additive manufacturing apparatus according to claim 10, wherein
the control system is configured to adjust the curing radiation pattern and/or the curing radiation intensity using the sensor signal from the radiation sensor.

12. Additive manufacturing apparatus according to claim 1, wherein the sensor signal comprises information about the surface shape and/or topography of the layer where solidification takes place during processing.

13. Additive manufacturing apparatus according to claim 1, further comprising positioning devices arranged to control a position of the product in the vat, and wherein the control system is configured to adjust a vertical position or rate of motion in a vertical direction of the work piece support in the vat so as to adjust a submersion of the work piece surface below the surface of the radiation-curable fluid, thereby controlling inflow of radiation-curable fluid from the vat reservoir to the layer where solidification takes place during processing.

14. Method of building a product by additive manufacturing according to a planned geometry by successive solidification of a radiation-curable fluid in a layer where solidification takes place during processing in a continuous solidification mode, the method comprising the steps of:
providing radiation-curable fluid in a vat;
providing a work piece surface for adding material to build the product;
providing a layer where solidification takes place during processing in the continuous solidification mode, the layer extending in a vertical direction from a fluid surface of the radiation-curable fluid to the work piece surface of the product;
generating a two-dimensional exposure pattern of curing radiation in the layer where solidification takes place during processing, wherein the exposure pattern is defined by a curing radiation pattern geometry and/or curing radiation intensity;
collecting radiation from the layer where solidification takes place during processing in the continuous solidification mode by means of a radiation sensor;
generating a sensor signal comprising information indicative of a solidification process status in the layer where solidification takes place during processing, based on the collected radiation;
adjusting process control parameters controlling the solidification in the layer where solidification takes place during processing, in response to said sensor signal, where the process control parameters include one or more of an amount and a rate of feeding radiation-curable fluid to the layer where solidification takes place during processing by the feed control mechanism.

15. Method according to claim 14, wherein feeding radiation-curable fluid to the layer includes feeding radiation-curable fluid in a continuous manner, at least partly during exposure of the layer with curing radiation.

16. Method according to claim 14, wherein adjusting process control parameters includes adjusting a two-dimensional curing radiation pattern and/or a curing radiation intensity using the sensor signal from the radiation sensor.

17. Method according to claim 14, wherein the sensor signal comprises information about the surface shape at least one location on the surface of the layer.

18. Method according to claim 14, wherein the sensor signal comprises information about the surface topography of at least parts of the surface of the layer.

* * * * *